US008550888B2

(12) United States Patent
Hildreth, Jr. et al.

(10) Patent No.: US 8,550,888 B2
(45) Date of Patent: Oct. 8, 2013

(54) ACTUATOR FOR A FAN-POWERED DAMPER

(75) Inventors: Edward Douglas Hildreth, Jr., Clarksville, TN (US); Robert F. Schult, Clarksville, TN (US); Goutam Duvvada, Clarksville, TN (US); Doyle R. Goodman, Clarksville, TN (US); Gary A. Huss, Clarksville, TN (US); Mark W. Stephans, Clarksville, TN (US)

(73) Assignee: Trane International Inc., Piscataway, NJ (US)

( * ) Notice: Subject to any disclaimer, the term of this patent is extended or adjusted under 35 U.S.C. 154(b) by 968 days.

(21) Appl. No.: 12/456,330

(22) Filed: Jun. 15, 2009

(65) Prior Publication Data

US 2010/0314569 A1    Dec. 16, 2010

(51) Int. Cl.
*F24F 7/06*     (2006.01)
*F24F 7/007*    (2006.01)
*F24F 13/10*    (2006.01)
*F24F 13/14*    (2006.01)

(52) U.S. Cl.
USPC ............ 454/273; 454/272; 454/278; 251/212

(58) Field of Classification Search
USPC ............................ 454/272, 273, 278; 251/212
IPC .............................. F16K 13/00; F24F 13/14, 7/00
See application file for complete search history.

(56) References Cited

U.S. PATENT DOCUMENTS

| 2,135,810 | A | * | 11/1938 | Germonprez | 454/318 |
| 2,169,168 | A | * | 8/1939 | Shipley | 236/9 R |
| 2,355,412 | A | * | 8/1944 | Bird | 454/359 |
| 2,616,356 | A | * | 11/1952 | Cunningham | 454/259 |
| 2,804,008 | A | * | 8/1957 | Koch | 454/272 |
| 2,811,022 | A | * | 10/1957 | Lathrop | 62/427 |
| 2,836,191 | A | * | 5/1958 | Wallin et al. | 251/212 |
| 3,060,833 | A | * | 10/1962 | Pledger | 454/357 |
| 3,204,548 | A | * | 9/1965 | McCabe | 454/352 |
| 3,312,159 | A | * | 4/1967 | Shepherd | 251/212 |
| 3,353,551 | A |   | 11/1967 | Smale |  |
| 3,447,443 | A | * | 6/1969 | Silvey | 454/335 |
| 3,605,603 | A |   | 9/1971 | McCabe |  |
| 4,064,905 | A | * | 12/1977 | Nilsson | 454/335 |
| 4,338,967 | A |   | 7/1982 | McCabe |  |
| 4,487,214 | A | * | 12/1984 | Tatum | 454/335 |
| 4,686,892 | A | * | 8/1987 | Foster | 454/313 |

(Continued)

FOREIGN PATENT DOCUMENTS

SU        547594      *  5/1977 ............... F24F 7/06
SU        547594 A    *  5/1977

*Primary Examiner* — Kang Hu
*Assistant Examiner* — Phillip E Decker
(74) *Attorney, Agent, or Firm* — William O'Driscoll

(57) ABSTRACT

An HVAC (heating, ventilating and air conditioning) damper includes a series of pivotal damper blades that are opened by an air pressure differential across opposite sides of the damper. In some embodiments, a fan discharging against the damper blades provides the necessary air pressure to open the damper. To control how far the damper opens, an actuator moves a variable position abutment that obstructs the damper blades to limit how far they can pivot in the open direction. The position of the abutment is infinitely adjustable to provide the damper with infinite adjustment over a range of open positions. In some embodiments, the abutment applies a unidirectional torque to the damper blades regardless of whether the damper is opening or closing.

9 Claims, 6 Drawing Sheets

(56) References Cited

U.S. PATENT DOCUMENTS

| | | |
|---|---|---|
| 4,723,481 A | 2/1988 | Hart et al. |
| 4,844,120 A * | 7/1989 | Myers .................. 251/212 |
| 5,096,156 A * | 3/1992 | Wylie et al. .................. 251/77 |
| 5,167,192 A * | 12/1992 | Pingel et al. .................. 110/182.5 |
| 5,238,220 A * | 8/1993 | Shell et al. .................. 454/257 |
| 5,249,596 A * | 10/1993 | Hickenlooper et al. .................. 454/233 |
| 5,277,658 A * | 1/1994 | Goettl .................. 454/259 |
| 5,345,966 A * | 9/1994 | Dudley .................. 454/325 |
| 5,775,988 A * | 7/1998 | Eakin .................. 454/256 |
| 6,181,557 B1 * | 1/2001 | Gatti .................. 454/184 |
| 6,250,326 B1 * | 6/2001 | Kimball et al. .................. 454/369 |
| 6,497,162 B2 * | 12/2002 | Spurr .................. 74/421 A |
| 6,662,405 B2 * | 12/2003 | Vitry .................. 16/355 |
| 6,780,098 B2 * | 8/2004 | Nishida et al. .................. 454/155 |
| 6,855,050 B2 * | 2/2005 | Gagnon et al. .................. 454/369 |
| 6,857,577 B2 * | 2/2005 | Hunka .................. 454/258 |
| 6,868,806 B1 * | 3/2005 | Schimmeyer .................. 122/155.1 |
| 7,178,291 B2 * | 2/2007 | Vasquez .................. 49/82.1 |
| 7,188,481 B2 * | 3/2007 | DeYoe et al. .................. 62/115 |
| 7,533,691 B2 * | 5/2009 | Marcoux et al. .................. 454/333 |
| 7,635,296 B2 * | 12/2009 | Gagnon et al. .................. 454/241 |
| 2002/0175305 A1 * | 11/2002 | McCabe et al. .................. 454/335 |
| 2004/0045304 A1 * | 3/2004 | Park .................. 62/183 |
| 2004/0182449 A1 * | 9/2004 | Schneider .................. 137/527 |
| 2004/0209566 A1 * | 10/2004 | Caliendo et al. .................. 454/156 |
| 2010/0291860 A1 * | 11/2010 | Kupferberg .................. 454/319 |

\* cited by examiner

ACTUATOR FOR A FAN-POWERED DAMPER

BACKGROUND OF THE INVENTION

1. Field of the Invention

The subject invention generally pertains to heating, ventilating and air conditioning (HVAC) dampers and more specifically to an actuator for such a damper.

2. Description of Related Art

HVAC systems often include various dampers for controlling airflow through the system. The dampers typically comprise a series of interconnected damper blades driven by an actuator that tilts the blades in unison between open and closed positions. A coupling or linkage that connects the drive actuator to the damper blades can transmit significant torque from the actuator to the blades, thus the blades need to be sufficiently strong to withstand such torque. Increasing a blade's strength and stiffness, however, can increase the blade's cost. Moreover, stronger, thicker blades can increase the damper's airflow resistance and thus reduce its efficiency when fully open.

A second problem pertains to a drive actuator having to drive or tilt the blades both clockwise and counterclockwise to selectively open and close the damper. Reversing the torque direction can involve backlash or play between the actuator and the damper blades, which can cause inaccurate blade positioning. Also, repeated torque reversal can cause fatigue that can weaken various parts of the damper.

Consequently, there is a need for a damper/actuator system that is more efficient, accurate and cost effective.

SUMMARY OF THE INVENTION

It is an object of some embodiments of the invention to provide a damper actuator that applies a torque in only one direction regardless of whether the damper is opening or closing.

Another object of some embodiments is to provide a damper that under the impetus of a given air pressure differential can open to infinite select open positions.

Another object of some embodiments is to provide a connection between an actuator and a plurality of damper blades without using a roller that travels along a slot.

Another object of some embodiments is allow an actuator to separate from a bar or blade-connecting member that interconnects a plurality of damper blades, whereby the damper blades can quickly move to a closed position without the actuator having to respond as quickly.

One or more of these and/or other objects of the invention are provided by a damper that includes a housing, a plurality of damper blades pivotally coupled to the housing, and an abutment. An air pressure differential urges the damper blades to pivot from a less-open position to a more-open position while the abutment is controllably movable to limit how far the damper opens.

The present invention provides a damper for controlling air having an air pressure differential. The damper comprises a housing defining an opening across which the air pressure differential exists. A plurality of damper blades are pivotally mounted to the housing in proximity with the opening. The plurality of damper blades are movable over a range of pivotal positions between a more-open position and a less-open position. The air is more free to flow through the opening when the plurality of damper blades are in the more-open position than when the plurality of damper blades are in the less-open position. The air pressure differential urges the plurality of damper blades toward the more-open position. An abutment is coupled to the housing such that the abutment is movable relative to the housing and is movable relative to the plurality of damper blades. The abutment is movable over a range of blocking positions between a first position and a second position. The abutment in the first position holds the plurality of damper blades at the less-open position in opposition to the air pressure differential. The abutment in the second position allows the air to move the plurality of damper blades toward the more-open position.

The present invention also provides a damper for controlling air, wherein the damper comprises a housing defining an opening. The damper also comprises a plurality of damper blades pivotally mounted to the housing in proximity with the opening. The plurality of damper blades are movable over a range of pivotal positions between a more-open position and a less-open position, wherein the air is more free to flow through the opening when the plurality of damper blades are in the more-open position than when the plurality of damper blades are in the less-open position. The damper also comprises a fan selectively energized and de-energized such that the fan when energized urges the air to flow through the opening such that the air urges the plurality of damper blades to the more-open position. The damper further comprises an abutment being coupled to the housing such that the abutment is movable relative to the housing and is movable relative to the plurality of damper blades. The abutment is movable over a range of blocking positions between a first position and a second position, wherein the abutment in the first position holds the plurality of damper blades at the less-open position regardless of whether the fan is energized, and the abutment in the second position allows the air to move the plurality of damper blades toward the more-open position when the fan is energized.

The present invention further provides a damper for controlling air, comprising a housing defining an opening. The damper also comprises a plurality of damper blades pivotally mounted to the housing in proximity with the opening. The plurality of damper blades are movable over a range of pivotal positions between a more-open position and a less-open position, wherein the air is more free to flow through the opening when the plurality of damper blades are in the more-open position than when the plurality of damper blades are in the less-open position. The damper also comprises a blade-connecting member that interconnects the plurality of damper blades such that the plurality of damper blades move in unison. The damper further comprises a fan disposed within the housing and being selectively energized and de-energized such that the fan when energized urges the air to flow through the opening such that the air urges the plurality of damper blades to the more-open position. The damper also comprises an abutment being coupled to the housing such that the abutment is movable relative to the housing, movable relative to the blade-connecting member and is movable relative to the plurality of damper blades. The abutment is movable over a range of blocking positions between a first position and a second position, wherein the abutment in the first position holds the plurality of damper blades at the less-open position regardless of whether the fan is energized, and the abutment in the second position allows the air to move the plurality of damper blades toward the more-open position when the fan is energized. The abutment engages the blade-connecting member when the plurality of damper blades are in the more-open position while the abutment is in the second position, and the abutment is spaced apart from the blade-connecting member when the plurality of damper blades are in the less-open position while the abutment is in the second position. The plurality of damper blades experience a closing torque exerted by the abutment against the blade-connecting member not only when the plurality of damper blades are closing but also when the plurality of damper blades are opening.

BRIEF DESCRIPTION OF THE DRAWINGS

FIG. 6a is a cross-sectional view taken along line 6a-6a of FIG. 6.

DESCRIPTION OF THE PREFERRED EMBODIMENT

Figure 1:
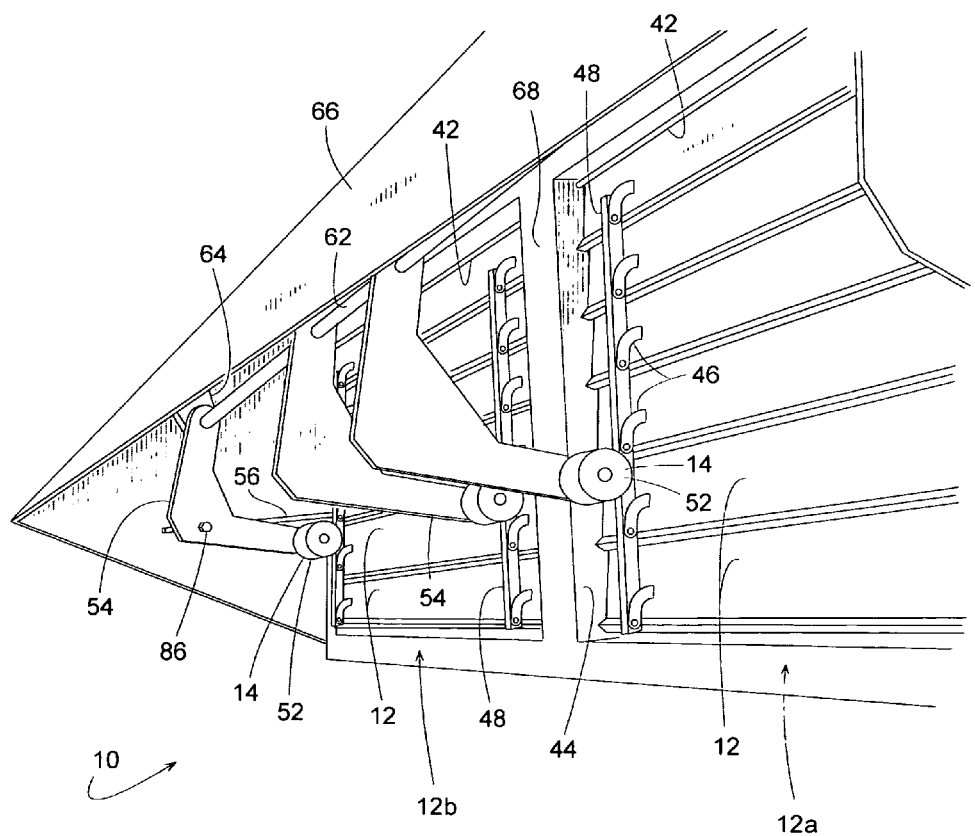
FIG. 1 is a perspective view of an air-operated damper apparatus with a controllable abutment.

FIGS. 1-8 illustrate an air damper apparatus 10 that includes a plurality of damper blades 12 actuated by air pressure with the blades' pivotal travel being limited by a variable position abutment 14. Although damper 10 can be used in a wide variety of applications, damper 10 will be described, for sake of example, as being an exhaust damper for an HVAC air handler 16 such as those used for cooling or heating a comfort zone within a building 18.

In this example, air handler 16 comprises a housing 20 (e.g., a sheet metal enclosure), a heat exchanger 22 for heating or cooling air 30, a blower 24 for moving air 30, a supply air duct 26 for conveying conditioned air 30a to a comfort zone, a return air duct 28 for conveying used air 30b back to housing 20, a return air damper 32 for selectively directing air 30 either outside and/or to heat exchanger 22, a fresh air damper 34 for conveying outdoor air 30c into housing 20, exhaust air damper 10 for determining the amount of return air 30b to be exhausted outdoors, a fan 36 for forcing air 30b through damper 10, and an actuator 38 for controlling damper 10.

Figure 2:
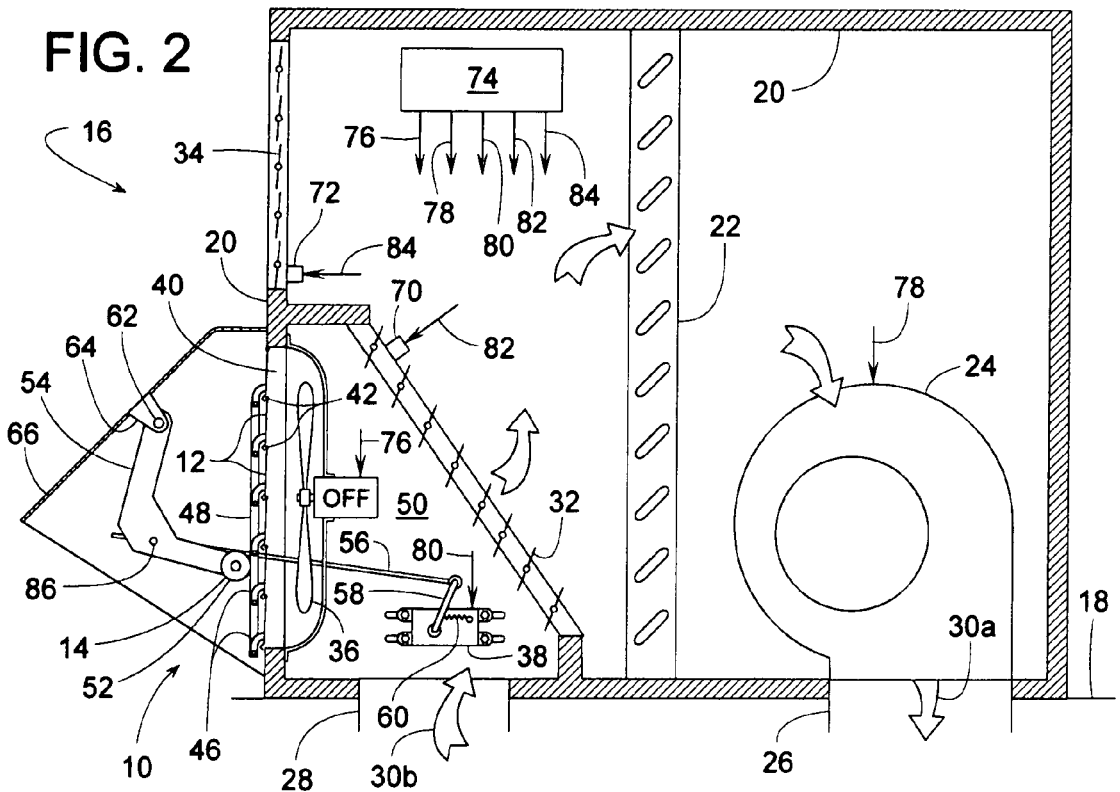
FIG. 2 is a cross-sectional view of an air handler that includes the damper apparatus of FIG. 1, wherein the damper apparatus is shown in a first configuration.
Figure 3:
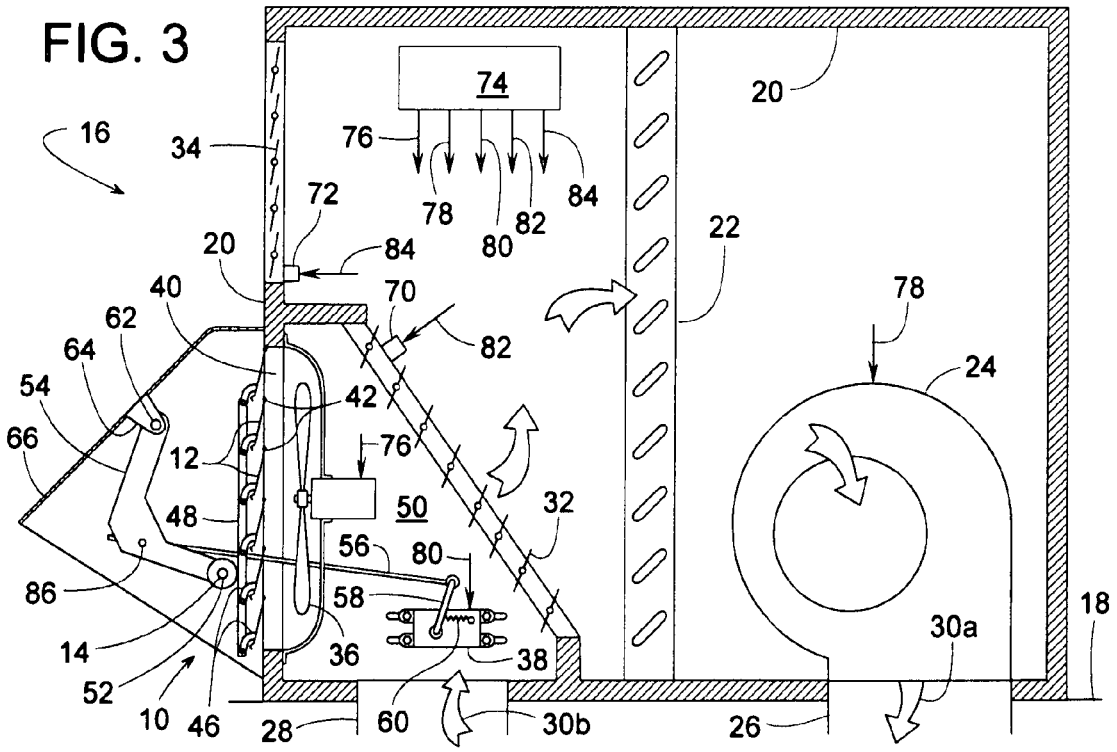
FIG. 3 is a cross-sectional view similar to FIG. 2 but showing the damper in another position.
Figure 7:
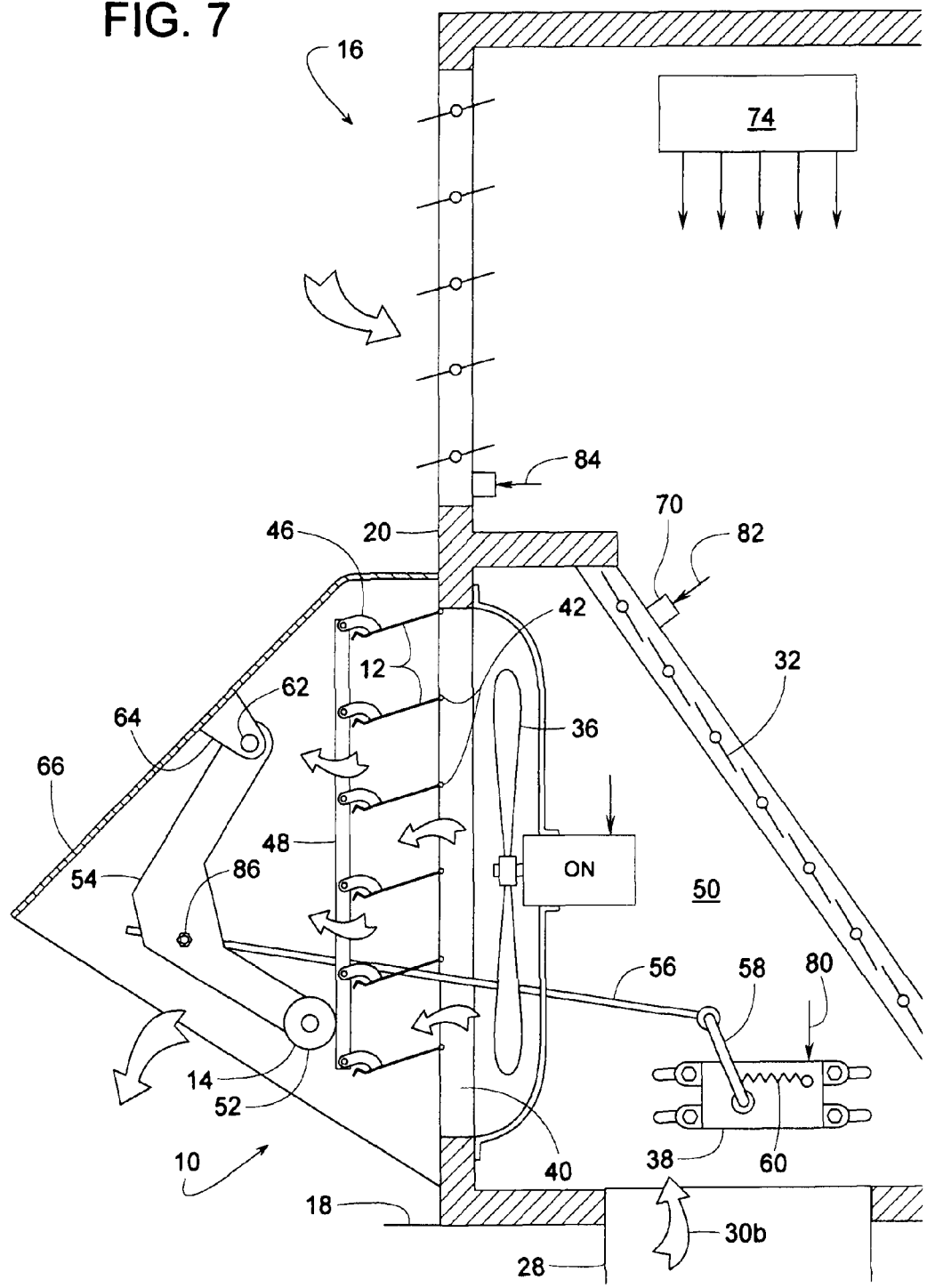
FIG. 7 is an enlarged view of FIG. 4.
Figure 8:
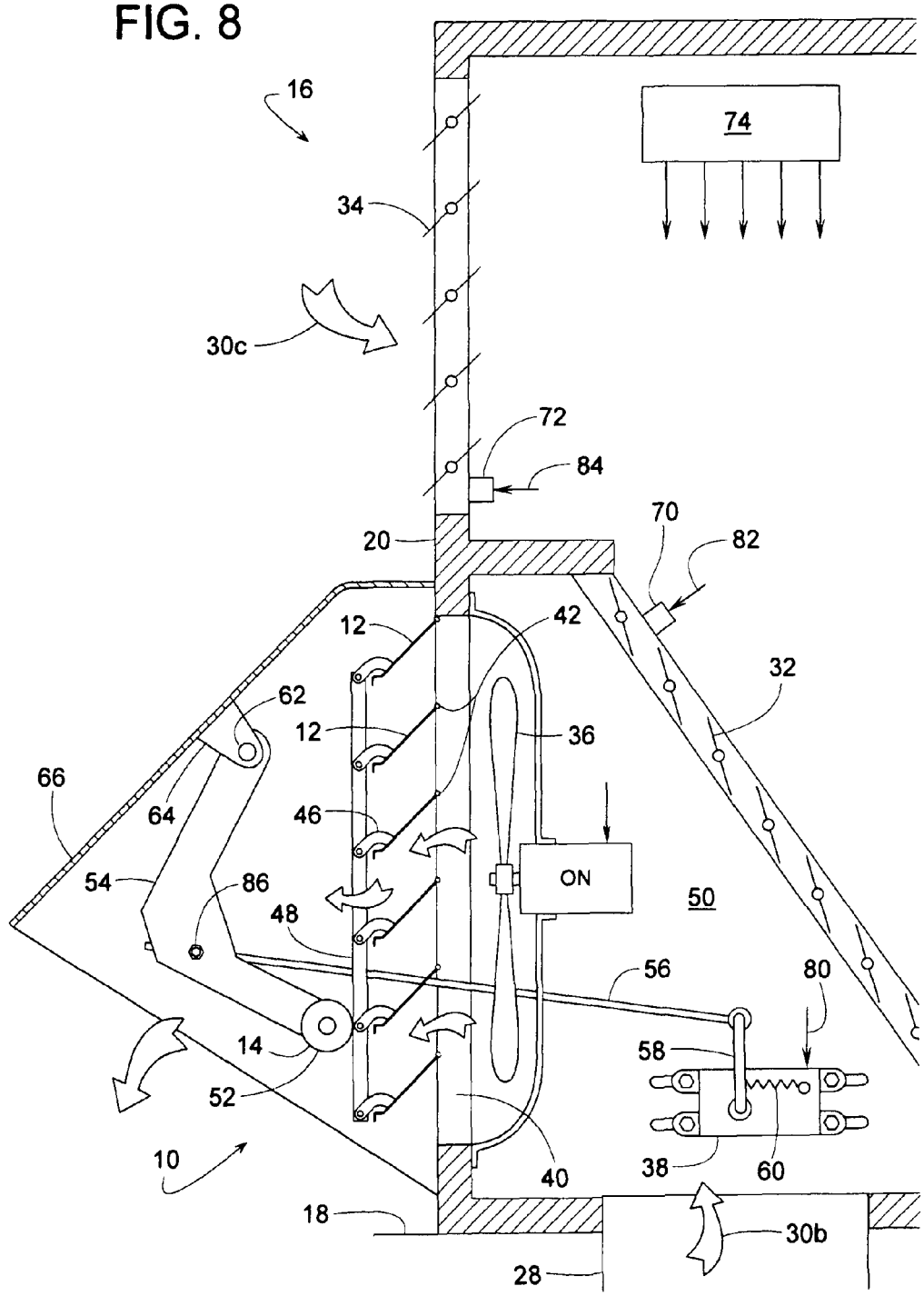
FIG. 8 is a cross-sectional view showing the damper at an intermediate position between that of FIGS. 6 and 7.

The plurality of damper blades 12 are installed in proximity with an opening 40 in housing 20. Although the exact construction of damper 10 may vary, in this example, a plurality of shafts 42 pivotally couple damper blades 12 to a frame 44 of housing 20. So that blades 12 can pivot in unison, a plurality of connectors 46 couple blades 12 to a common blade-connecting member 48 (e.g., a bar). The plurality of damper blades 12 can pivot over a range of pivotal positions between a more-open position (FIGS. 4 and 7) and a less-open position (FIGS. 1, 2, 3, 5 and 6). The less-open position can be where damper blades 12 are fully closed (FIGS. 1, 2, 5 and 6) or where blades 12 are just slightly open (FIG. 3). FIG. 8 shows the plurality of damper blades 12 at an intermediate position between the more-open position (FIGS. 4 and 7) and the less-open position (FIGS. 1, 2, 3, 5 and 6).

The combined weight of blade-connecting member 48, connectors 46 and blades 12 urge the plurality of damper blades 12 to pivot down to their closed position (FIGS. 1, 2, 5 and 6). A positive air pressure differential across opposite faces of damper 10 urges the plurality of damper blades 12 to their more-open position. The expression, "positive pressure differential," means the air pressure decreases in the direction blades 12 pivot as damper 10 opens. Thus, a positive air pressure differential means that the air pressure on the right side of damper 10 is greater than that of the outdoor ambient air on the left side of damper 10 ("right" and "left" being as viewed in the cross-sectional drawing figures). In other words, a positive pressure differential tends to blow damper 10 open. The positive pressure differential can be created by fan 36 discharging against damper blades 12 and/or by air pressure inside building 18, a return air chamber 50 or duct 28 being greater than the ambient air pressure outdoors.

Figure 4:
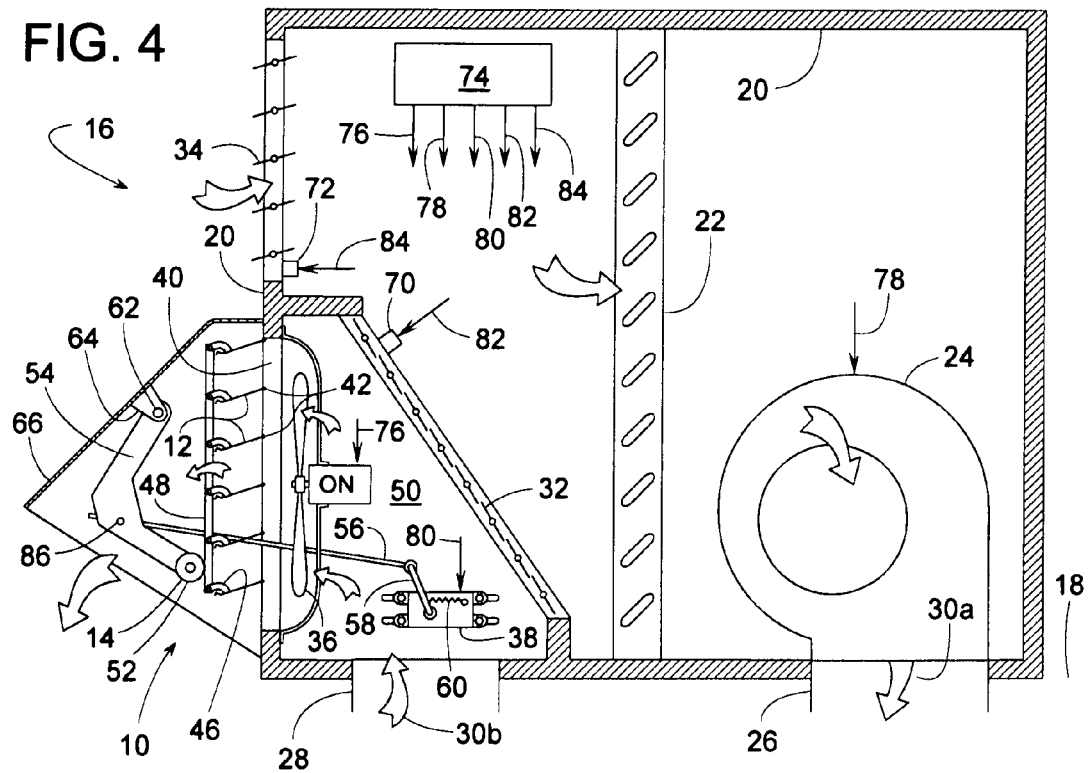
FIG. 4 is a cross-sectional view similar to FIG. 2 but showing the damper apparatus in a second configuration.
Figure 6:
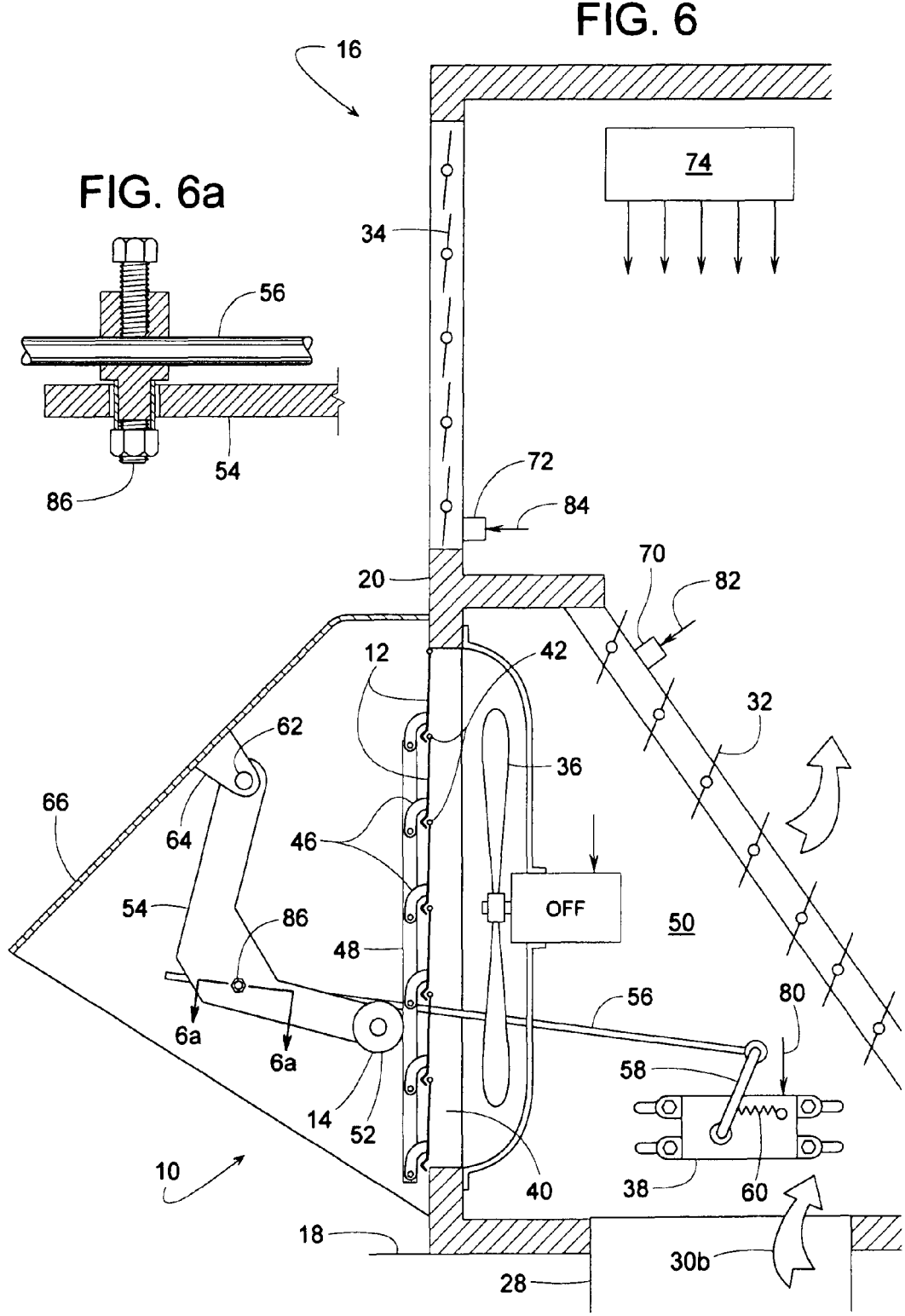
FIG. 6 is an enlarged view of FIG. 2.

To controllably move damper blades 12 to any select position within a range of infinite pivotal positions, actuator 38 adjusts the position of abutment 14 relative to damper 10. Abutment 14 engaging blade-connecting member 48 limits how far blades 12 can pivot in the open direction. For instance, moving abutment 14 to a first position, as shown in FIGS. 1, 2 and 6, holds damper blades 12 completely closed regardless of any reasonable pressure differential across damper 10. Abutment 14 in a second position, as shown in FIGS. 4 and 7, allows a positive pressure differential, such as that created by fan 36 being energized, to blow damper blades 12 to their more-open position (e.g., fully open). Abutment 14 in another "first position," as shown in FIG. 3, allows damper 10 to be slightly open. Abutment 14 in the position of FIG. 8 allows a positive pressure differential, such as that created by fan 36 being energized, to blow damper blades 12 to some intermediate open position.

Although the design of abutment 14, actuator 38 and the interconnection between the two may vary, abutment 14 preferably comprises a roller 52 attached to a pivotal arm 54. Roller 52 preferably is softer than blade-connecting member 48 so that roller 52 provides shock absorption in the event of an impact between roller 52 and member 48. Roller 52, for example, can be made of plastic, and member 48 can be made of aluminum. A link 56 couples arm 54 to a drive arm 58 of actuator 38 so that the rotation of drive arm 58 pivots arm 54 to move roller 52. Actuator 38, in this example, is a motor that powers drive arm 58 counterclockwise (as viewed in the cross-sectional drawing figures), thus actuator 38 is a powered actuator. When the actuator's motor is de-energized, a tension spring 60 forces drive arm 58 back in a clockwise direction toward the position shown in FIGS. 2 and 6.

The aforementioned design allows a damper to comprise multiple sets of damper blades 12a and 12b to be controlled by multiple abutments 14, as shown in FIG. 1. Abutments 14 can be supported by a plurality of pivotal arms 54 each of which are fixed relative to a rotatable shaft 62. Shaft 62 is supported by a set of lugs 64 mounted underneath an exhaust hood 66 of housing 20. Shaft 62 being rotatable relative to lugs 64 allows link 56 to pivot arms 54 about a longitudinal axis of shaft 62. Arms 54 pivot in unison, as each arm 54 is fixed to shaft 62. This design can be particularly useful in controlling two sets of damper blades 12a and 12b that are separated by a structural frame member 68 (FIG. 1) because the design does not require interconnecting linkage between the two sets of damper blades 12a and 12b in order for them to open.

Return air damper 32 and fresh air damper 34 can be controlled by an equivalent or modified version of actuator 38, or dampers 32 and 34 can be operated by conventional actuators 70 and 72. Actuators 70 and 72 are schematically illustrated to represent common actuators that are well known to those of ordinary skill in the art. To control air handler 16 and its dampers, a controller 74 provides outputs 76, 78, 80, 82 and 84 for selectively energizing or otherwise controlling fan 36, blower 24, and actuators 38, 70 and 72. Controller 74 might also be used for controlling a refrigerant circuit or some other heating/cooling system associated with heat exchanger 22. For sake of example, the operation of air handler 16 will be described with reference to heat exchanger 22 functioning as an evaporator of a refrigerant circuit for cooling air 30.

In the operating mode of FIG. 2 (also shown in FIGS. 1 and 6), controller 74 commands actuator 70 to open damper 32 and commands actuators 38 and 72 to close dampers 10 and 34. Damper 10 is closed by controller 74 de-energizing fan 36 and abutment 14 being at a first position obstructing blade-connecting member 48. Controller 74 energizes blower 24 to force air 30 from a comfort zone via return air duct 28, through open return damper 32, through heat exchanger 22 to be cooled, and out through supply air duct 26, wherein supply air duct 26 conveys the cooled air 30a back to the comfort zone. In this operating mode, substantially all of the comfort zone's air is recirculated through air handler 16. Substantially no outdoor air is added, and substantially no return air 30b is exhausted outside.

The configuration of FIG. 3 is similar to that of FIG. 2; however, the illustrated configuration of FIG. 3 represents various possible operating modes. In FIG. 3, actuator 38 positions abutment 14 to another "first position" such that damper 10 can be slightly open or closed tight, depending on the air pressure differential across damper 10. Fresh air damper 34 can also be closed or slightly open, depending on the need.

In one operating mode of FIG. 3, fan 36 is de-energized, fresh air damper 34 is closed tight, and a positive air pressure in return air chamber 50 (i.e., greater than the outdoor air pressure) forces damper 10 slightly open to release excess air pressure within building 18.

In a second operating mode of FIG. 3, exhaust fan 36 is energized, fresh air damper 34 is closed tight, and exhaust damper 10 is slightly open to forcibly draw air 30b out from with return air chamber 50 and exhaust it outside, thereby further reducing the air pressure within building 18.

In a third operating mode of FIG. 3, fan 36 is energized, fresh air damper 34 is slightly open, and exhaust air damper 10 is slightly open. This is similar to the operation of FIG. 2 but with some used return air 30b exchanged for some fresh outdoor air.

In a fourth operating mode of FIG. 3, fan 36 is de-energized, fresh air damper 34 is closed tight, and exhaust damper 10 is closed tight due a negative air pressure in return chamber 50, i.e., the outdoor air pressure is greater than the pressure in return air chamber 50. With damper 10 closed tight, abutment 14 will be slightly spaced apart from blade-connecting member 48. This fourth mode can be used to maintain a certain negative pressure in building 18, if so desired.

In the operating mode of FIG. 4 (also shown in FIG. 7), controller 74 commands actuator 38 to close return damper 32 and commands actuator 72 to open fresh air damper 34. Controller 74 also energizes fan 36 and commands actuator 38 to move abutment 14 to its second position. Controller 74 energizes blower 24 to draw in fresh outdoor air 30c and force the air through heat exchanger 22 to be cooled. Supply air duct 26 then conveys the cool fresh air 30 to the comfort zone. The used return air 30b is then exhausted outside through damper 10. In this operating mode, substantially none of the used return air is recirculated back to the comfort zone, but instead fresh outdoor air is used.

FIGS. 4 and 7 show both dampers 10 and 34 being fully or nearly fully open; however, dampers 10 and 34 can be opened at any intermediate position. FIG. 8, for example, shows dampers 10 and 34 partially open with return air damper 32 partially open as well. This provides the comfort zone with a mixture of fresh and recirculated return air, rather than substantially 100% fresh outdoor air (FIGS. 4 and 7) or substantially 100% recirculated return air (FIGS. 2 and 6). In providing such a mixture of fresh air 30c and return air 30b, actuators 38 and 72 preferably move their respective dampers 10 and 34 in some directly proportional manner. Although dampers 10 and 34 preferably both open together and close together, their relationship of movement is not necessarily linear, so one damper might open farther or faster than the other.

The open/close travel limits of abutment 14 can be adjusted by various means including, but not limited to, adjusting the mounting position of actuator 38 relative to housing 20, or adjusting the position of a connecting pin 86 on link 56 as shown in FIG. 6a.

Figure 5:
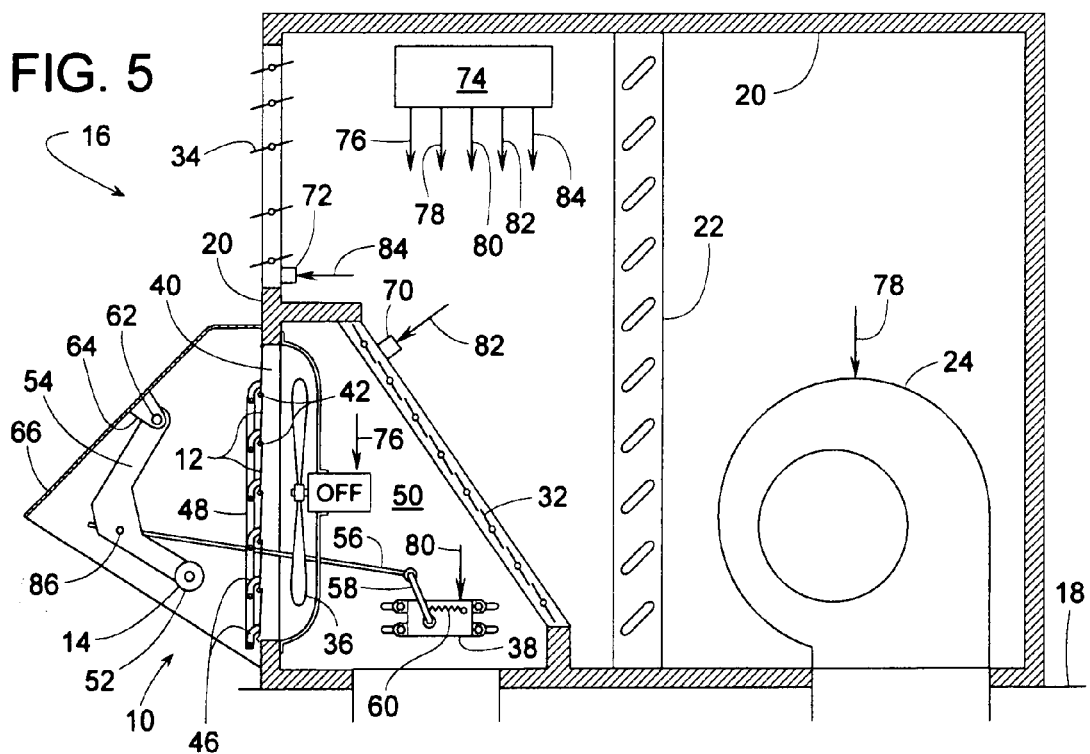
FIG. 5 is a cross-sectional view similar to FIGS. 2-4 but showing the abutment spaced apart from a blade-connecting member, wherein the damper apparatus is in a third configuration.

FIG. 5 shows how abutment 14 and blade-connecting member 48 can be spaced apart if actuator 38 moves abutment 14 to an intermediate or open position, and fan 36 is de-energized with a negative or zero pressure differential across damper 10.

Although the invention is described with respect to a preferred embodiment, modifications thereto will be apparent to those of ordinary skill in the art. The scope of the invention, therefore, is to be determined by reference to the following claims:

The invention claimed is:

1. A damper apparatus for controlling air, comprising:
a housing defining an opening;
a plurality of damper blades pivotally mounted to the housing in proximity with the opening, the plurality of damper blades are movable over a range of pivotal positions between a more-open position and a less-open position, wherein the air is more free to flow through the opening when the plurality of damper blades are in the more-open position than when the plurality of damper blades are in the less-open position;
a blade-connecting member interconnecting the plurality of damper blades such that the plurality of damper blades move in unison;
a fan selectively energized and de-energized such that the fan when energized urges the air to flow through the opening such that the air urges the plurality of damper blades to the more-open position;
a powered actuator; and
an abutment being coupled to the housing and to the powered actuator such that the abutment is movable relative to the housing and is movable relative to the plurality of damper blades, the abutment being movable by the powered actuator over a range of blocking positions between a first blocking position and a second blocking position, wherein the plurality of damper blades, the fan and the abutment provide the damper apparatus with at least three selective configurations as follows:
in a first configuration, the abutment in the first blocking position holds the plurality of damper blades at the less-open position regardless of whether the fan is energized,
in a second configuration, the abutment in the second blocking position allows the air to move the plurality of damper blades toward the more-open position and thereby move the blade-connecting member toward the abutment when the fan is energized, and
in a third configuration, the abutment is in the second blocking position, the fan is de-energized, the blade-connecting member is spaced-apart from the abutment, and the plurality of damper blades are in the less-open position.

2. The damper apparatus of claim 1, wherein the plurality of damper blades being movable toward the less-open position in response to the abutment moving toward the first blocking position, and the plurality of damper blades being movable toward the less-open position in opposition to the air urging the plurality of damper blades to the more-open position.

3. The damper apparatus of claim 1, wherein the plurality of damper blades experience a closing torque exerted by the abutment, and the plurality of damper blades experience the closing torque not only when the plurality of damper blades are closing but also, when the plurality of damper blades are opening.

4. The damper apparatus of claim 1, wherein the abutment is one of a plurality of abutments, and the blade-connecting member is one of a plurality of blade-connecting members that interconnect the plurality of damper blades, wherein the plurality of abutments engage the plurality of blade-connecting members when the plurality of damper blades are in the more-open position while the plurality of abutments are in the second blocking position, and the plurality of abutments are spaced apart from the plurality of blade-connecting members when the plurality of damper blades are in the less-open position while the plurality of abutments are in the second blocking position.

5. The damper apparatus of claim 1, wherein the abutment includes a roller.

6. The damper apparatus of claim 1, wherein the housing includes an exhaust hood to which the abutment is coupled for pivotal movement relative thereto.

7. The damper apparatus of claim 1, wherein the plurality of damper blades at the less-open position are partially open to allow some air to pass through the damper apparatus.

8. The damper apparatus of claim 1, wherein the range of blocking positions is adjustable to vary an extent to which the plurality of damper blades can open and close.

9. A damper apparatus for controlling air, comprising:
a housing defining an opening;
a plurality of damper blades pivotally mounted to the housing in proximity with the opening, the plurality of damper blades are movable over a range of pivotal positions between a more-open position and a less-open position, wherein the air is more free to flow through the opening when the plurality of damper blades are in the more-open position than when the plurality of damper blades are in the less-open position;
a blade-connecting member that interconnects the plurality of damper blades such that the plurality of damper blades move in unison;
a fan disposed within the housing and being selectively energized and de-energized such that the fan when energized urges the air to flow through the opening such that the air urges the plurality of damper blades to the more-open position; and
an abutment being coupled to the housing such that the abutment is movable relative to the housing, movable relative to the blade-connecting member and is movable relative to the plurality of damper blades, the abutment is movable over a range of blocking positions between a first blocking position and a second blocking position, wherein the abutment in the first blocking position holds the plurality of damper blades at the less-open position regardless of whether the fan is energized, and the abutment in the second blocking position allows the air to move the plurality of damper blades toward the more-open position when the fan is energized, the abutment engages the blade-connecting member when the plurality of damper blades are in the more-open position while the abutment is in the second blocking position, and the abutment is spaced apart from the blade-connecting member when the plurality of damper blades are in the less-open position While the abutment is in the second blocking position, the plurality of damper blades experience a closing torque exerted by the abutment against the blade-connecting member not only when the plurality of damper blades are closing but also when the plurality of damper blades are opening.

* * * * *